United States Patent [19]

Messina

[11] Patent Number: 5,672,866
[45] Date of Patent: Sep. 30, 1997

[54] SYSTEM AND METHOD FOR REMOTE IMAGE SENSING AND AUTOCALIBRATION

[75] Inventor: Peter V. Messina, Santa Monica, Calif.

[73] Assignee: Hughes Electronics, Los Angeles, Calif.

[21] Appl. No.: 618,647

[22] Filed: Mar. 19, 1996

[51] Int. Cl.⁶ .................................................. G01D 18/00
[52] U.S. Cl. .................................. 250/252.1 A; 250/236
[58] Field of Search ........................... 250/252.1 A, 342, 250/339.14, 236; 356/320, 448; 359/197

[56] References Cited

U.S. PATENT DOCUMENTS 5,325,171  6/1994  Shimizu ........................ 250/252.1 A

FOREIGN PATENT DOCUMENTS 0238811  11/1985  Japan ............................... 250/236

*Primary Examiner*—David P. Porta
*Assistant Examiner*—Richard Hanig
*Attorney, Agent, or Firm*—Gordon R. Lindeen III; Michael W. Sales; Wanda K. Denson-Low

[57] ABSTRACT

An autocalibration system is provided for a back-scanning, gimbal-mounted step and stare imaging system. The step and stare imaging system effects step and stare performance even though the gimbal mounted platform upon which the system telescope is mounted rotates at a constant rate. The autocalibration system calibrates the system's static line of sight positioning and the system's rotational, or angular rate line of sight positioning.

22 Claims, 9 Drawing Sheets

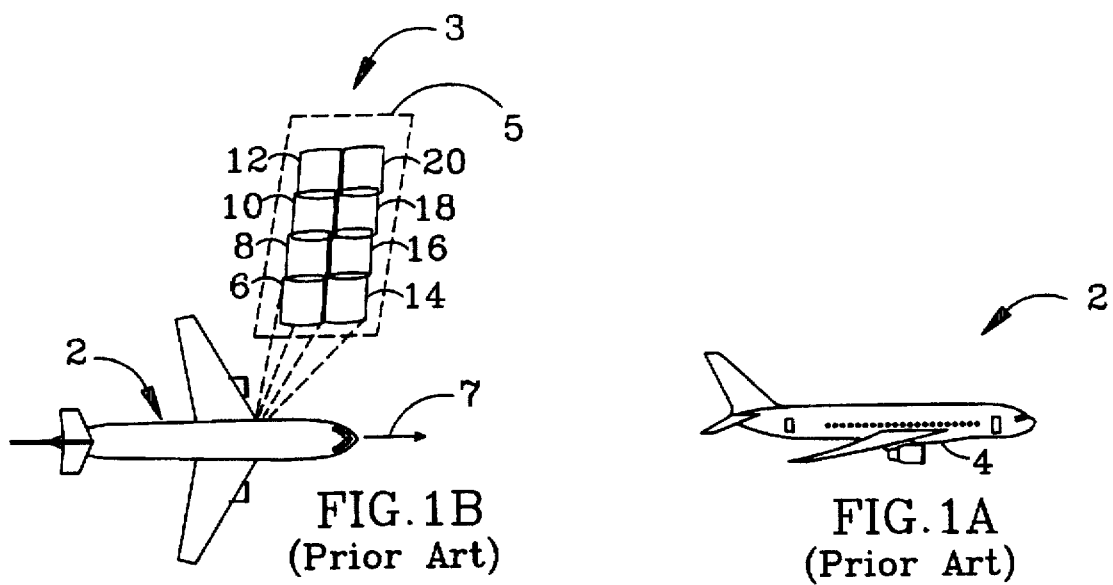
FIG.1B
(Prior Art)
FIG.1A
(Prior Art)
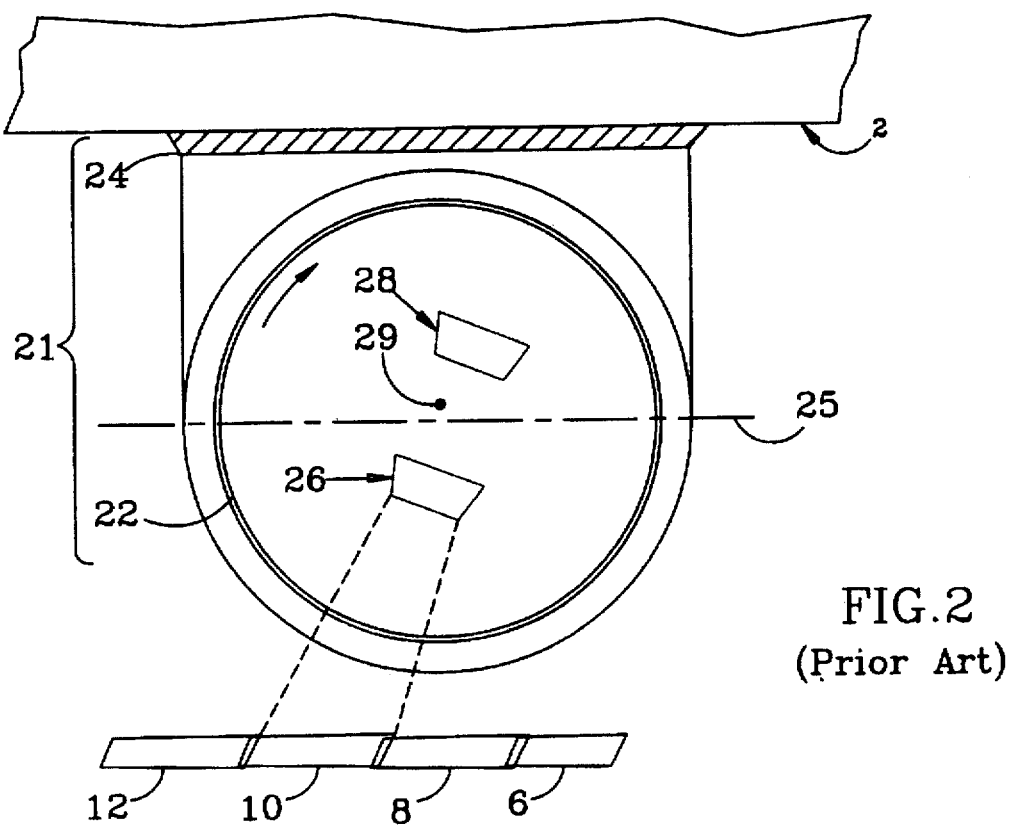
FIG.2
(Prior Art)

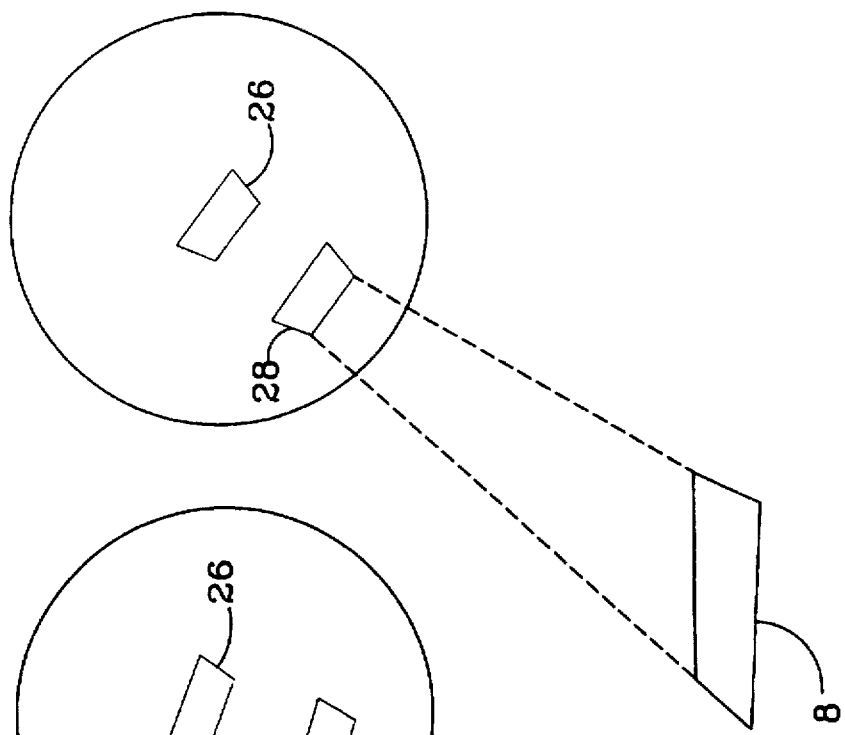
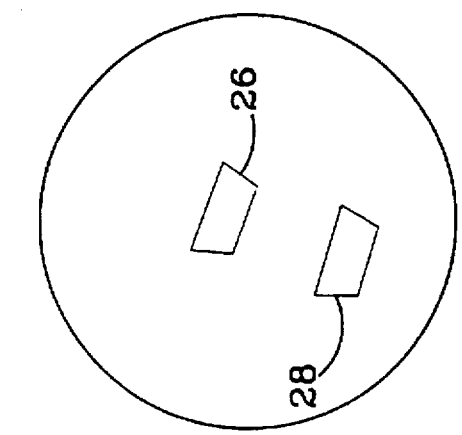
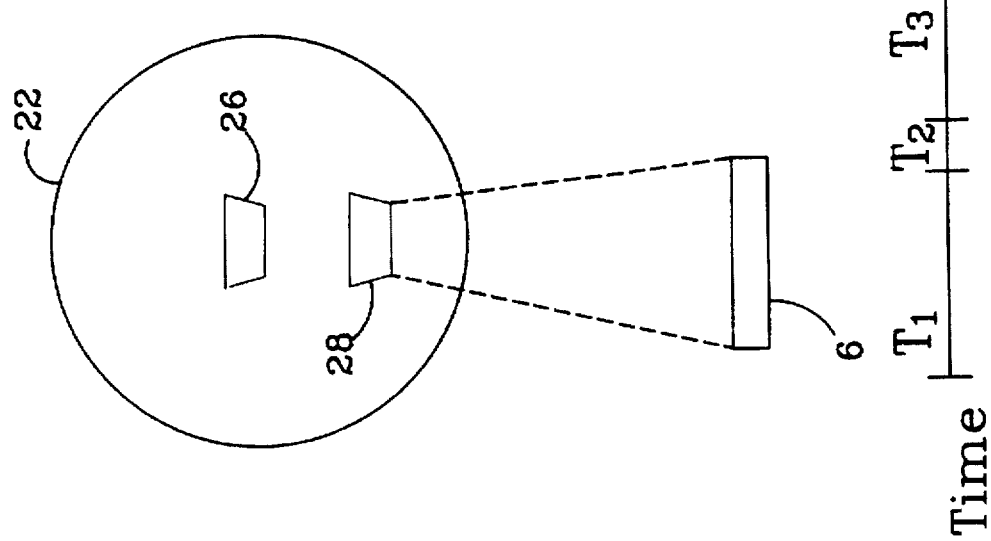
FIG. 3C (Prior Art)
FIG. 3B (Prior Art)
FIG. 3A (Prior Art)

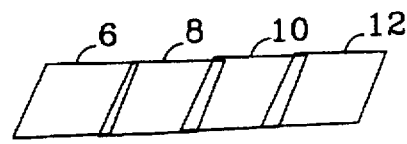

SYSTEM AND METHOD FOR REMOTE IMAGE SENSING AND AUTOCALIBRATION

BACKGROUND OF THE INVENTION

1. Field of the Invention

The invention relates to the imaging or, more precisely, mapping, of wide areas of terrain by an aircraft which passes over an area targeted for mapping.

2. Description of the Related Art

Imagers related to the invention are generally carried aboard an aircraft, as illustrated in FIG. 1A. The aircraft may be an airplane 2, as illustrated, an orbiting satellite or a "launch and recover" rocket payload. Whichever mode of transportation is employed, the basic operation remains the same. That is, as the aircraft passes over a target zone the imager, held in the transparent belly 4 of the aircraft 2, accumulates images from the terrain 3 below by sweeping across it at an angle which is substantially orthogonal to the direction of the aircraft's flight. The images are formed from electromagnetic radiation emitted or reflected from the target area 5. The radiation may be of any wavelength, but the most commonly employed wavelengths are in the range from the infrared through the ultraviolet. The images thus formed are employed in a variety of end-use applications such as crop analysis, soil-association mapping, drought and desertification analysis, deforestation analysis, oil exploration, ore-deposit exploration—even archeological research and analysis.

Generally, the terrain 3 is swept out as illustrated in FIG. 1B. That is, as the aircraft progresses along its flight path 7, the imager, sweeps out successive, overlapping images which are then combined to form a mosaic of the target area. The order of image acquisition in the illustration of FIG. 1B is image 6, then 8, 10, 12, 14, 16, 18 and, finally, 20. Alternative acquisition sequences are possible. For example, a checkerboard pattern could be swept out on a first pass, with the remaining areas of the mosaic filled in on a second pass over the target terrain 5. This approach requires, of course, that the imager accurately register scenes from one pass with those of another, subsequent, pass. Alternatively, with a 6,8,10,12,20,18,16,14 sequence, the imager may cease sweeping as soon as it begins to acquire an image from area 12 and resume sweeping after acquiring an image from area 20.

FIG. 2 illustrates the basic components of an imaging system 21. A gimbaled platform 22 is suspended by a mount 24 from the aircraft 2. The platform 22 could be any one of many configurations: a solid disk, a ring, or other shapes suited to support and position an imaging system. The gimbal isolates the platform 22 from undesirable aircraft movement which may arise from high winds, air pockets, microbursts or vehicle acceleration. A gimbal generally provides two axes of rotation but, for the sake of clarity, only one axis 25 is illustrated. Gimbals are well known in the art. A brief discussion of them may be found in *Van Nostrand's Scientific Encyclopedia*, Seventh Edition, Douglas M. Considine, P. E. Editor, Van Nostrand Reinhold, New York, 1989, at page 1336.

A telescope 26 and imager 28 are positioned upon the platform 22 so that the telescope 26 images target areas into the imager 28. The imager 28, typically a high-speed video system comprising an image intensifier, image formation device such as a charge coupled device or vidicon or similar tube, and assorted filters and readout electronics, receives the radiation captured by the telescope 26 and transforms it into a form which is more suitable for analysis and transmission. Alternatively, the image may be formed on photographic film or magnetic tape. The platform 22 rotates about a central axis of rotation 29, thus sweeping the telescope's field of view across target areas 6, 8, 10 and 12.

As the telescope 26 and imager 28 rotate, the imager 28 must integrate (i.e., gather sufficient light to form) the target image quite rapidly to prevent blurring of the image. But, at the same time, the imager 28 must be held "on target" long enough to collect sufficient radiation to build up an image. Analyzed in terms of shutter speed, the shutter must remain open long enough to gather an image, but not so long as to blur the image as the imager rotates. Further, the captured image must be "read out" of the image capture system before it is overwritten by the next-acquired image. This read-out process may entail simply advancing the film in a film storage system, reading the voltage values from a CCD array, or reading the voltages from a vidicon or similar video-imaging tube.

One may consider the image acquisition process as a series of integration and readout steps. Using this model, the image may be accumulated, or integrated, in a small fraction of the time required for the imager to travel from one target region to the next, leaving a large portion of the imager's time dedicated to image readout and "dead" time. To increase the efficiency of the imager, one may attempt to rotate the platform 22 at a higher rate, but the rotation speed is limited, once again, by the pitfalls of image blurring and insufficient integration of radiation.

However, a "step and stare" approach may be used to increase mapping speed while maintaining adequate integration time. FIGS. 3A, 3B and 3C illustrate the basics of the step and stare approach. Step and stare imaging is known in the art. See, for example, W. D. McGinn, S. Nallanthighal, *Infrared Search and Track Programs*, SPIE Vol. 1950, April 1993. In FIG. 3A, the platform 22 system is positioned to acquire (integrate and read out) an image from region 6 for a period of time $T_1$, as indicated on the time-line at the bottom of FIG. 3A. In FIG. 3B, the platform 22 is rotated into position during time $T_2$ to acquire an image from region 8, which occurs in FIG. 3C. The image from region 8 is acquired during $T_3$. As the time-line indicates, with the step and stare approach an image is integrated over a relatively lengthy period of time while the platform 22 remains stationary (relative to the image region or inertial reference frame), then the platform 22 is rapidly repositioned to form the next image.

Positioning of the platform 22 for a step and stare system is no trivial matter. A relatively large and massive platform 22 must be repeatedly accelerated and positioned with a high degree of accuracy. Furthermore, because greater resolution is almost always desirable, there is always an impetus for larger, more massive imaging systems (a system's angular limit of resolution=1.22 $\lambda/D$, where D is the system aperture and $\lambda$ is the wavelength of the radiation being imaged). Naturally, as imaging systems become more and more massive, the difficulty associated with accelerating and positioning them for step and stare operation increases correspondingly.

Not only is the acceleration and positioning of more massive imaging systems problematic, calibration is commensurately more difficult with a step and stare system. Furthermore, it is especially desirable that the calibration process be automated to ensure precise, reliable operation at a reasonable cost when a system is originally assembled in the factory. Additionally, if one component of the imaging system fails, the system may be wholly or partially replaced "in the field". Manual calibration under such circumstances, e.g. before an over-flight, is susceptible to the pressures of the situation and can lead to less than ideal performance. Autocalibration would also save time in a situation where, because of changing weather conditions and other parameters affecting launch opportunities, time is often of the essence. In some circumstances, e.g. during a mission after the system is launched, it is impractical to calibrate the system manually. In spite of the extreme and exacting precautions taken to protect an imager, it may be "thrown out" of calibration at some point during takeoff or flight. If an autocalibration system were available, it could be employed to salvage an otherwise abortive mission in such a situation.

For the forgoing reasons, there is a need for a remote sensing system which can be rapidly and accurately positioned to map a target area. Further, to reduce costs and improve reliability, it is also desirable that such a system include an automatic calibration feature.

SUMMARY OF THE INVENTION

The invention is directed to an imaging system and method which incorporate automatic position and scan-rate calibration.

In one embodiment, the invention comprises an autocalibration system for use with a step and stare back-scanning imaging system. The system comprises a reference mirror, a beam aligner, an inertial measurement unit (IMU) and sense and control electronics. The autocalibration system calibrates the positioning and scan rate-operation of a back-scanning step and stare imaging system.

In another embodiment, the invention comprises a back-scanning step and stare imaging system with an integral autocalibration system. The system comprises a gimbaled platform with a telescope and back-scanning mirror(s) mounted upon the platform. In normal operation, the platform rotates at a constant rate, thus sweeping the telescope's field of view across a target image area at a constant rate. When a target area comes into the telescopes's field of view, the back-scanning mirror rotates in a direction counter to that of the platform at a rate that "freezes" the image area in the mirror. The mirror reflects the image area into the system's imager.

Once an image is integrated, the back-scanning mirror is accelerated in the same direction as, but at a higher rate than, the platform so that the mirror may "catch up with" the platform's rotation and "freeze" the next image area. In this way, step and stare operation is effected using a platform-mounted telescope which rotates at a constant rate. Instead of requiring that the entire massive system be repeatedly accelerated and positioned, only the relatively small back-scanning mirror need be accelerated and positioned to realize step and stare performance.

To calibrate the system's static positioning function, the imager is rotated into a calibration position, one in which the telescope's field of view is aligned with that of the beam aligner, and the reference mirror is moved into position to intercept the image from the telescope. The calibration system injects a disturbance signal of known magnitude and frequency into the system and the beam aligner emits an optical test signal which travels through the telescope, is reflected off the reference mirror, and returns through the telescope into the beam aligner. The beam aligner provides an output signal which indicates whether the optical components are properly aligned. In this case it indicates whether the back-scanning mirror has properly positioned the target (beam aligner) image on the reference mirror, in spite of the disturbance signal's effects.

If the image has been properly positioned, the calibration process is terminated. If the image has been improperly positioned, the scanning mirror is adjusted using the sense and control electronics, and the calibration process is repeated until the scanning mirror positions the beam aligner's image within a predetermined range. Naturally, the required accuracy may vary from mission to mission, but it will be related to the angular resolution available from the imaging system.

Similarly, the angular rate of the imaging system is calibrated by moving the system into a calibration position, one in which the telescope's field of view is coincident with that of the beam aligner, and moving the reference mirror into a calibration position. The system is then rotated through an angle corresponding to that of an image area while the beam aligner sends optical test signals during a period of time equal to an integration period. The test signals travel through the telescope and are reflected from the scanning mirror onto the reference mirror, then back from the reference mirror, off the scanning mirror, through the telescope and into the beam aligner. The beam aligner provides an output signal during the scanning period which indicates whether the image reflected from the scanning mirror is stationary, i.e., whether the scanning mirror has effectively "zeroed out" the platform's rotation, thereby "freezing" the target image area within the imaging system's field of view. If the image is sufficiently stable, the calibration process is terminated.

Again, the degree of stability required will vary from mission to mission, but will generally relate to the system's angular resolution. If the system's angular stability does not meet the minimum requirements, the sense and control electronics adjust the angular acceleration rate of the scanning mirror and repeat the angular calibration sequence until the scanning mirror's angular rate falls within the predetermined acceptable range.

In both the angular rate and position calibration sequences the autocalibration system uses the imaging system's inertial measurement unit to account for any motion of the aircraft relative to inertial space. In one embodiment, the reference mirror is attached to the IMU and the beam aligner is mounted on the gimbal-platform; in another embodiment their positions are basically interchanged.

These and other features, aspects and advantages of the invention will be apparent to those skilled in the art from the following detailed description and accompanying drawings, in which:

BRIEF DESCRIPTION OF THE DRAWINGS

FIGS. 1A and 1B, described above, are respectively plan and front elevation views illustrating a known image mapping process to which the invention is related.

FIG. 2, described above, is a conceptual elevation view diagram of a known high-speed video imager employed in an image-mapping system.

FIGS. 3A, 3B and 3C, described above, are conceptual elevation views illustrating successive stages in the position/timing relationship of a known step and stare imaging system's image capture operation.

DETAILED DESCRIPTION OF THE INVENTION

Figure 4:
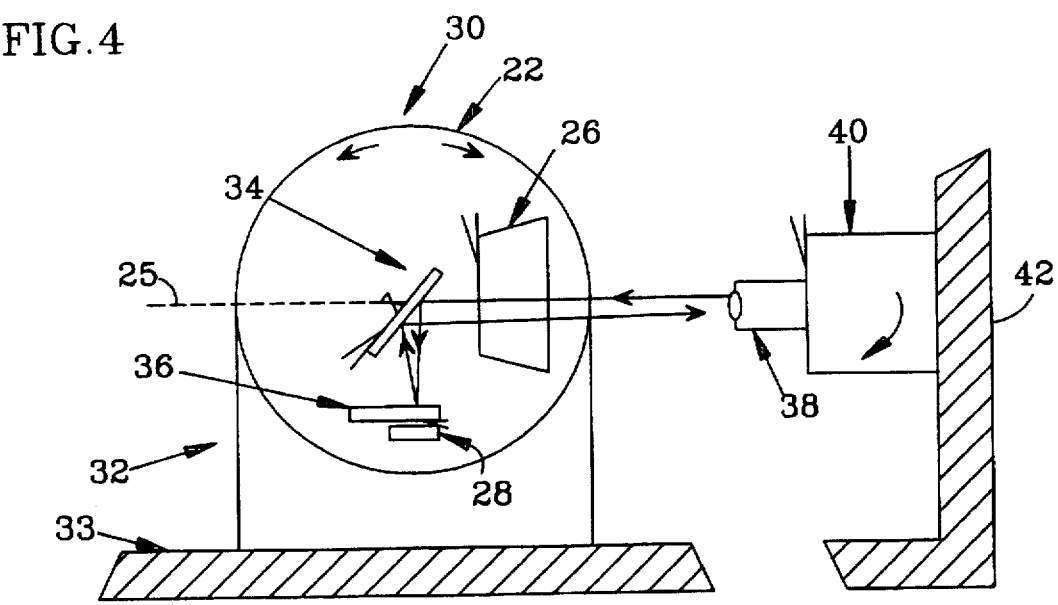
FIG. 4 is an elevation view illustrating the physical layout of one embodiment of the invention.

The physical layout of one embodiment of the back scanning imaging system with autocalibration is illustrated in FIG. 4. A gimbal 30 which supports a telescope 26 has at least one axis 25 which provides isolation from undesirable movements of the aircraft which transports the imaging system. The gimbal 30 comprises a conventional gimbal platform 22 and gimbal support 32. The gimbal is supported within the aircraft by the gimbal mount 33.

The telescope 26 is mounted on the gimbal platform 22 along with an imager 28, the aperture of which is positioned approximately perpendicular to that of the telescope 26. In the preferred embodiment, a scanning mirror 34 is positioned upon the platform 22 so that, in its "neutral" position, the mirror's reflective surface forms approximately 45° angles with both the telescope and imager apertures. A reference mirror 36 is carried by the platform 22 in a location such that during normal, i.e. image-capture, operations the mirror 36 remains outside the optical path between the scanning mirror 34 and the imager 28.

A beam aligner 38 and inertial measurement unit (IMU) 40 are located on an IMU platform 42, which is also affixed to the aircraft 2. In the preferred embodiment, the beam aligner is a Micro-Radian Instruments, Inc. model 210 and the IMU is a Litton Industries, Inc. model LN100G.

During image capture a conventional motor rotates the platform 22 at a constant rate, thereby sweeping past the image areas below 6, 8, 10 and 12 at a constant rate. As the field of view of the telescope 26 encompasses one of the target areas, the scanning mirror 34 is moved into position so that radiation from the target area travels through the telescope 26 and is reflected off the scanning mirror 34 into the imager 28. As noted above, the reference mirror 36 is positioned out of the optical path during image acquisition.

As the platform 22 continues to rotate, the scanning mirror 34 rotates in the opposite direction at a rate which is proportional to both the magnification of the telescope 26 and the angular rate of the platform 22. In this manner, the scanning mirror 34 presents a stationary view of the target area to the imager 28. This "backscanning" is described in greater detail in connection with FIG. 5 and 6.

Figure 5:
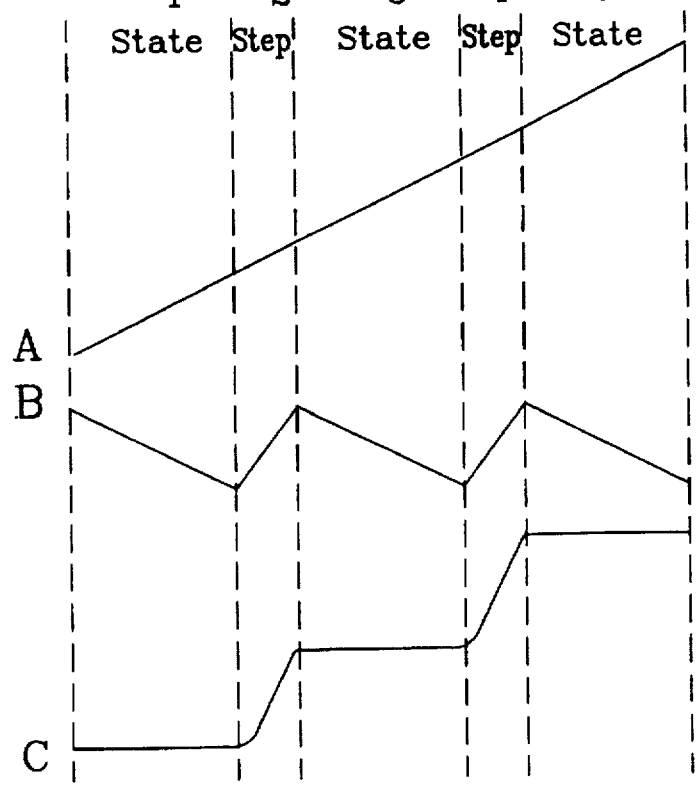
FIG. 5 is a timing diagram illustrating the timing/position relationships among the scanning mirror, the gimbal platform and the imaging target area shown in FIG. 4.

FIG. 5 illustrates the timing relationships among the image area, the platform 22 and the scanning mirror 34 of FIG. 4. Curve A of FIG. 5 represents the angular position of a point on the platform 22, plotted over time. Curve B plots the angular position of the line of sight (LOS) of the scanning mirror 34, relative to a point on the platform 22 along the neutral LOS of the mirror 34. Curve C depicts the LOS of the mirror 34 relative to a target area.

During time segment $T_1$ the platform 22 rotates at a constant rate, as illustrated by the constant slope of curve A. At the same time, the scanning mirror moves in the opposite direction (i.e., back-scans), as illustrated by the negative slope of curve B. The net effect is that the LOS of the scanning mirror, relative to the target region, remains constant, i.e., it "stares" throughout the period, as illustrated by curve C.

During the period $T_2$ the platform 22 continues to rotate at a constant rate (curve A), but the scanning mirror 34 reverses direction to rotate in the same direction as, but at a higher rate than, the platform 22, in order to step, or "catch up with" the platform 22 (curve B). The result is illustrated by curve C, where, at the end of $T_2$, the LOS of the scanning mirror 34 relative to the target area is the same as that of the platform 22.

During period $T_3$, the platform 22 continues its constant rotation, the scanning mirror 34 counter-rotates (i.e., "stares") and the net result is that the LOS of the scanning mirror 34 remains stationary relative to the target area, as illustrated by curve C. Periods $T_4$ and $T_5$ proceed in the same manner as explained for periods $T_2$ and $T_3$.

Returning now to FIG. 4 for a description of the autocalibration system's physical layout, the platform 22 may be rotated into a position at which the field of view of the telescope 26 includes that of the beam aligner 38. When the platform 22 is in this position, the step and stare imaging system may be calibrated. Calibration may take place during initial installation or whenever a constituent part of the imaging system is exchanged. If the aircraft suffers a particularly violent shock or if for some other reason the imaging system's performance degrades during a mission, it may also be desirable to recalibrate the system. The calibration process adjusts control parameters, to be discussed in more detail below, which ensure that the scanning mirror 34 is positioned correctly and that it rotates at precisely the rate required to hold the target image stationary within the imager.

Figure 6:
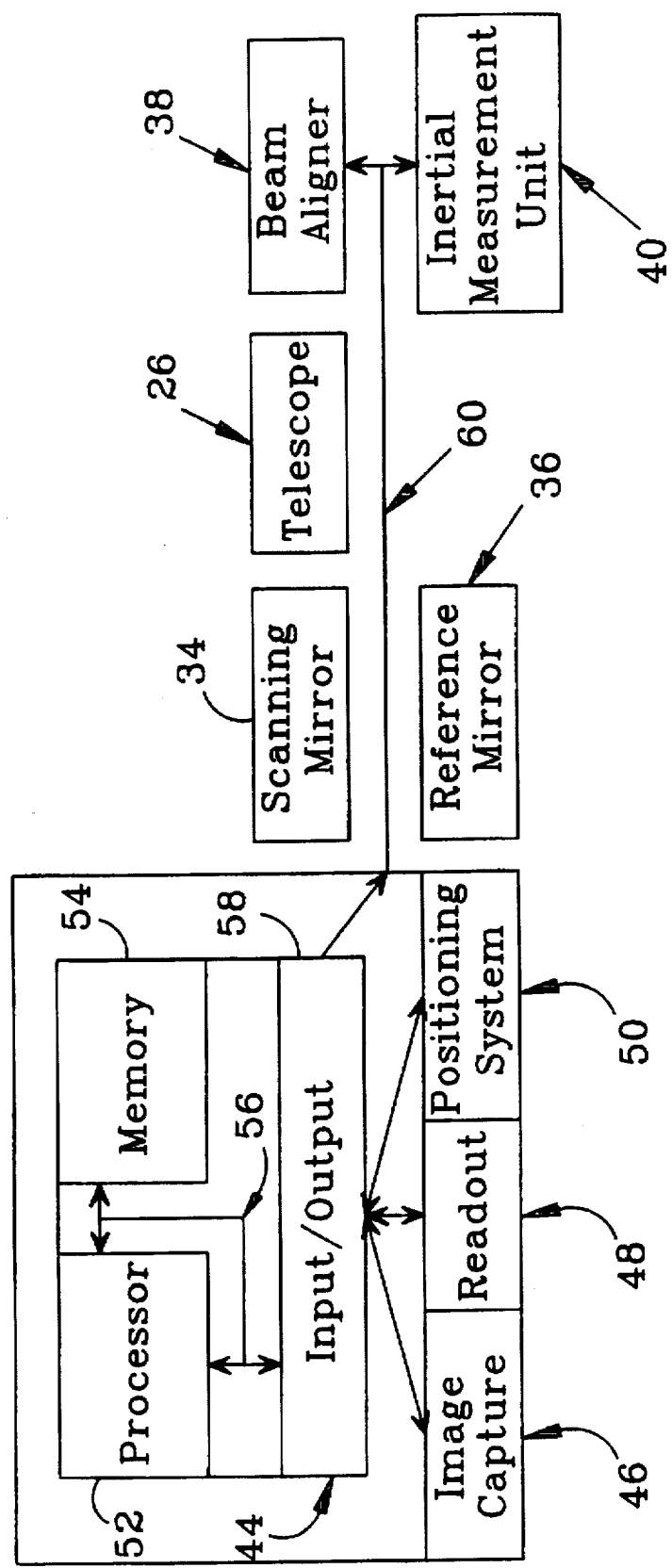
FIG. 6 is a block diagram of one embodiment of the back-scanning autocalibration system.

A block diagram of a preferred embodiment of the autocalibrated backscanning step and stare imaging system is displayed in FIG. 6. The imager 28 incorporates a controller 44 which exercises control over an image capture system 46, a readout system 48 and a positioning system 50. The image capture system 46 includes conventional optics and electronics to form and integrate an image received from the telescope 26. The readout system 48 provides long-term storage of the image thus captured by immediately transferring the image to any of a number of media such as film, magnetic tape, optical disk or, through RF transmission, to a ground station.

The positioning system 50 rotates the platform 22 and the scanning mirror 34, and places the reference mirror 36 in either a calibration or non-calibration mode in response to commands from the controller 44.

Additionally, the positioning system includes sensors which indicate the position of the scanning mirror 34, the reference mirror 36 and the platform 22. The controller 44 communicates with the beam aligner 38 and the IMU 40, both to direct their operations and to collect information they have gathered. The controller 44 is itself composed of three primary functional units: a processor 52, memory 54 and an input/output (I/O) 56 section which communicate through an internal communications bus 58. In general, the controller 44 functions in a manner that is well known in the art of computer systems. The unique operation of the controller 44 lies, not in its internal structure, but in its interactions with other components of the calibration system. These interactions are set forth in detail in connection with FIGS. 10 and 14.

The imager 28 is connected via a bidirectional data path 60 with the scanning mirror 34, reference mirror 36, beam aligner 38 and IMU 40. Although this path may be serial or parallel and the physical medium which carries data may be glass fiber or copper wires, in the preferred embodiment the data path is a Military Standard 1553 bus.

The controller 44 initiates a calibration sequence in response to a command issued by ground controllers, either at the time of system integration or during an imaging mission. During calibration, the controller 44 moves the reference mirror 36 into the calibration position, i.e., into the optical path between the scanning mirror 34 and the imager 28. The controller also controls the positioning of the platform 22 for calibration, i.e., a position as shown in FIG. 4, at which the field of view of the beam aligner 38 is aligned with the LOS of the reference mirror 36.

During calibration the controller also initializes the beam aligner 38 and the IMU 40. The controller then conducts a calibration sequence, which will be described in greater detail in connection with the following FIG. 10, but which basically consists of positioning the platform 22, acquiring data from the beam aligner 38 and IMU 40, computing a positioning error figure, adjusting platform position control parameters and repeating the process until the positioning error is reduced to an acceptable level.

Figure 7:
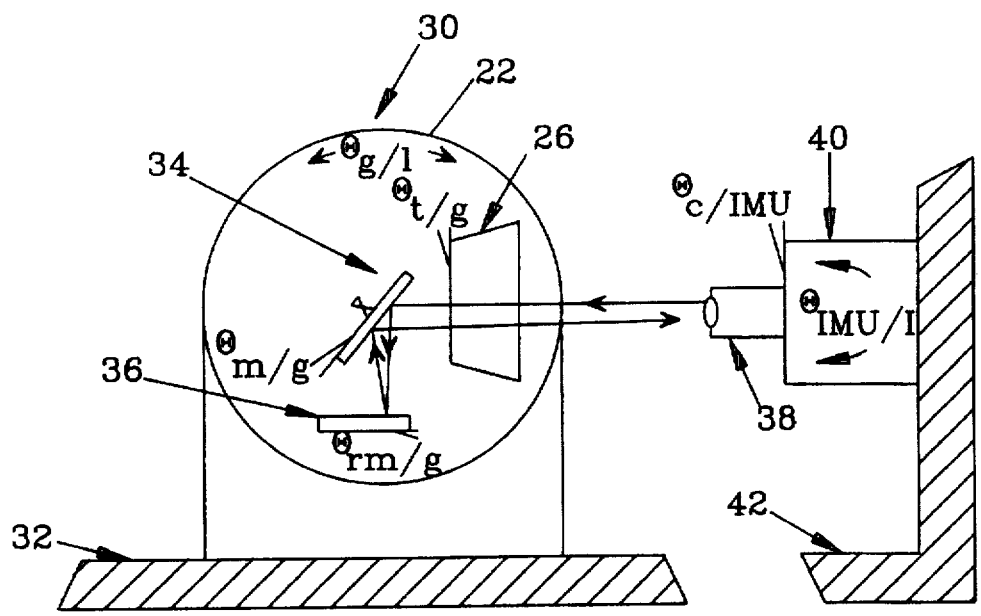
FIG. 7 is a simplified elevation view of illustrates the physical layout and angular relationships among the components which are used in calibrating the back-scanning mirror's position.

The angular relationships used in calibrating the static angular positioning of the back-scanning system are illustrated in FIG. 7. Once in the calibration position, a light beam from the beam aligner 38 is transmitted through the telescope 26, reflected off the scanning mirror 34 onto the reference mirror 36 and from the reference mirror 36 back to the scanning mirror 34, then through the telescope 26 for a return to the beam aligner 38. The beam aligner 38 measures the inertially-stabilized platform 22 and position of the scanning mirror 34, relative to the beam aligner 38. The IMU-measured inertial base position is subtracted from the measurement by the beam aligner 38 of the beam position to extract the true inertial line of sight (LOS) beam motion. This figure is then used by the controller 28 to adjust the reference mirror 36 position control parameter. The objective of the control process is that the system inertial line of sight equal zero ($\Theta_{LOS/I}=0$, i.e., that during image acquisition the target image does not move within the imager's field of view). This objective is achieved when:

$$\Theta_{m/g}=-(\tfrac{1}{2}M)(\Theta_{g/I})$$

where:

M=the telescope magnification $\Theta_{m/g}$=the scanning mirror position relative to the gimbal $\Theta_{g/I}$=the gimbal inertial position The measured LOS position is given by the difference between the beam aligner 38 and IMU 40 measurements:

$$\Theta_{LOS/meas}=\Theta_{col/meas}-\Theta_{IMU/meas}$$

where:

$\Theta_{LOS/meas}$=measured system inertial line of sight position $\Theta_{col/meas}$=the beam aligner's measured LOS position relative to the IMU $\Theta_{IMU/meas}$=the measured IMU position FIG. 7 also identifies:

$\Theta_{t/g}$=the telescope position relative to the gimbal $\Theta_{c/IMU}$=the beam aligner position relative to the IMU $\Theta_{IMU/I}$=the IMU position relative to the inertial reference frame $\Theta_{m/g}$=the scanning mirror position relative to the gimbal $\Theta_{rm/g}$=the reference mirror position relative to the gimbal The controller 44 adjusts the measured gimbal axis position error control parameter $\Theta_e$, which determines the scanning mirror position relative to the gimbal $\Theta_{m/g}$, until $\Theta_{LOS/meas}$ equals zero or an acceptable level near zero.

Figure 8:
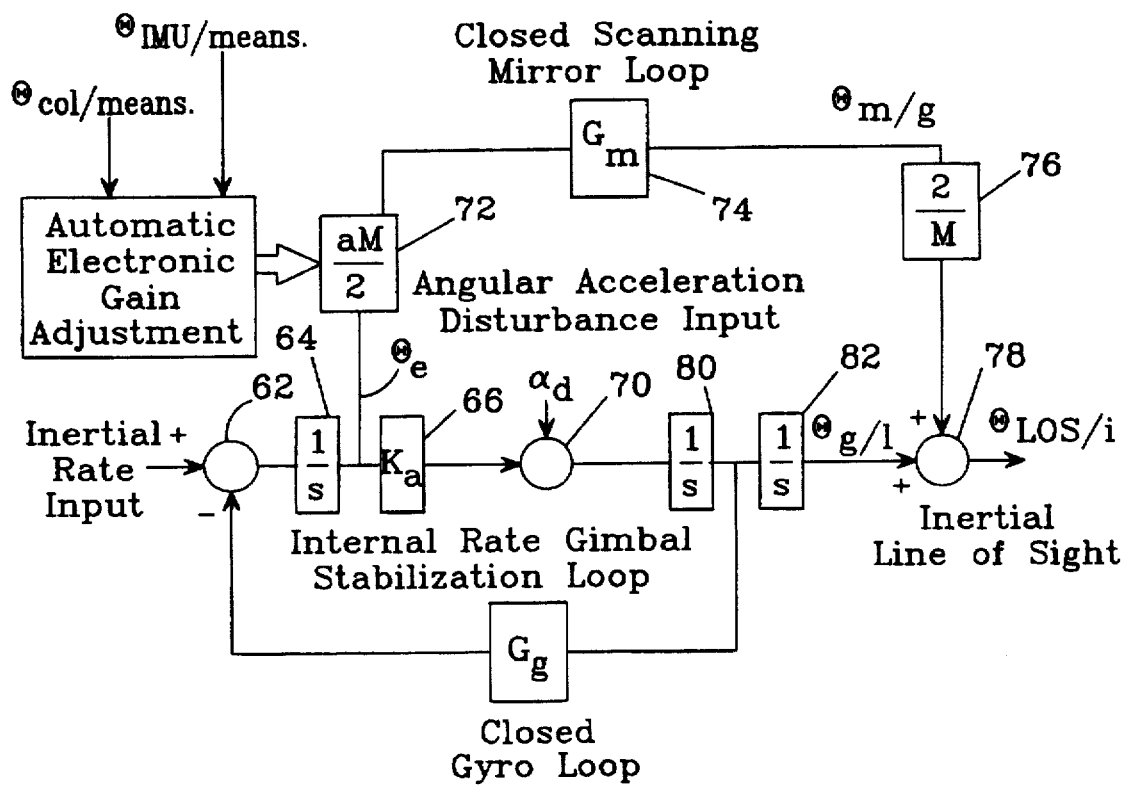
FIG. 8 is a block diagram of the back-scanning imager's closed loop transfer function.

FIG. 8 is a block diagram of the back-scanning imager's system transfer function. During normal operation the angular acceleration disturbance, $\alpha_g$, may be injected into the stabilization loop electronically through an error caused by an electrostatic discharge, for example, or it may be introduced inadvertently by bearing friction, cable spring restraint or a similar mechanism whenever a gimbal platform 22 is redirected. This term, which represents an undesirable disturbance, is one motivation for recalibration of the back-scanning system. During calibration a low-frequency disturbance, e.g., a 4 Hz signal, is introduced electronically and the system is adjusted to reduce the effects of this disturbance. Additionally, $K_a$ is the gimbal inertial rate loop gain in $\sec^{-2}$, $G_m$ is the scanning mirror's closed-loop gain/phase transfer function, $G_g$ is the closed loop gyro rate gain/phase transfer function, M is the telescope magnification, and a is the scanning mirror scale factor adjustment term.

The lower, gimbal stabilization, loop comprises, reading clockwise from the inertial rate input, a summing junction 62, an integration block 64, which produces an angular position output from the rate input, the gimbal inertial rate loop gain $K_a$ 66, a second summing junction 70 which introduces the acceleration disturbance $\alpha_g$, a second integration block 72 which yields an angular rate from the angular acceleration disturbance input and the gyro rate loop gain/phase transfer function $G_g$. For a more complete discussion of control system and Laplace transform techniques see "Modern Control Systems", Richard C. Dorf, third edition, Addison-Wesley Publishing Company, Reading Massachusetts, 1980 pages 23–145.

The scanning mirror loop is of particular interest because this is the loop which represents the corrective action of the calibration system. The measured gimbal axis inertial position error $\Theta_e$ is the input to the scanning mirror control loop. This is multiplied by aM/2, the mirror scale factor adjustment term 72, then by $G_m$, the scanning mirror closed loop gain/phase transfer function 74, to yield $\Theta_{m/g}$, the scanning mirror position relative to the gimbal platform 22. The scanning mirror position, $\Theta_{m/g}$, is then multiplied by 2/M in block 76, which represents the effect of the telescope 26 magnification on the line of sight of the scanning mirror 34.

The final summing junction 78 then yields the stabilization system's inertial line of sight position:

$$\Theta_{LOS/I}=(2/M)\Theta_{m/g}+\Theta_{g/I} \qquad (1)$$

which, when the system is "staring", should equal zero and is the parameter which is minimized during calibration. This minimization is achieved through the measurement, as previously mentioned, of $\Theta_{col/meas}$ and $\Theta_{IMU/meas}$, respectively the beam aligner 38 and IMU 40 outputs, and the use of these measurements to adjust the mirror scale factor adjustment term a, until $\Theta_{LOS/meas} \cong 0 (\Theta_{LOS/meas} = \Theta_{col/meas} - \Theta_{IMU/meas})$. Integration blocks 80 and 82 transform the disturbance acceleration input $\alpha_d$ into an angular position.

The mirror 34 position relative to the gimbal platform 22 is given by:

$$\Theta_{m/g} = (aM/2) G_m \Theta_e \qquad (2)$$

The inertial position error is given by:

$$\Theta_e = -G_g \Theta_{g/I} \qquad (3)$$

where $\Theta_{g/I} = \alpha_d / (s^2 + K_a G_g)$

Setting $aG_m G_g = 1 + \epsilon_s$, where $\epsilon_s$ is the scanning mirror adjustment error, the mirror 34 position, from equations 2 and 3, is given by:

$$\Theta_{m/g} = -(M/2)(1+\epsilon_s) \Theta_{g/I} \qquad (4)$$

and the inertial line of sight, from equations 1 and 4 is given by:

$$\Theta_{LOS/I} = -\epsilon_s \Theta_{g/I}$$

That is, the inertial line of sight position is equal to the scanning mirror adjustment error multiplied by the position of the gimbal relative to inertial space.

Figure 9:
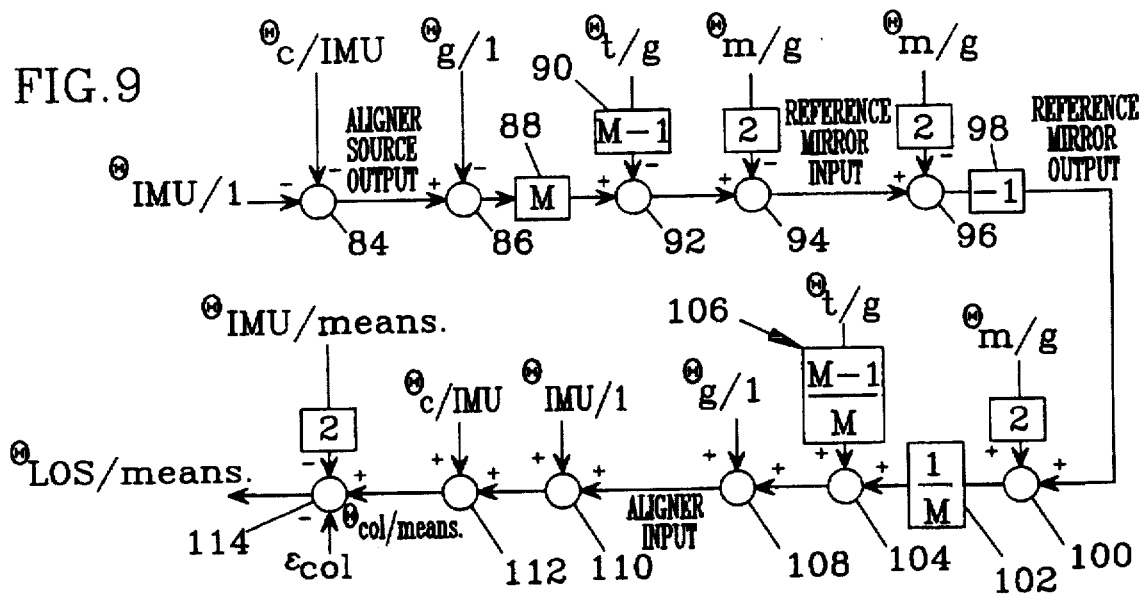
FIG. 9 is a control system block diagram for the calibration system.

The precision of the autocalibration process may be discerned from the control system block diagram of FIG. 9. Beginning at the top left and proceeding clockwise; during calibration, as the aligner 38 emits a test signal the signal's output direction, "source output", referenced to inertial space is given by summing $\Theta_{IMU/I}$ with $\Theta_{c/IMU}$ in block 84. The platform to inertial space angle $\Theta_{g/I}$ is added in block 86 to relate the signal to the platform 22 reference frame. The signal's angle is multiplied by M in block 88, accounting for the effect of the magnification of the telescope 26. The telescope to gimbal platform angle $\Theta_{t/g}$ is multiplied by M-1 in block 90 then summed with the signal angle in block 92. The resultant is then summed, in block 94, with twice the mirror to gimbal platform angle $\Theta_{m/g}$.

The output from block 94 is the reference mirror input which, in block 96 is summed with twice the reference mirror to gimbal platform angle $\Theta_{rm/g}$. The sign reversal of block 98 represents the signal's reflection from the reference mirror 36.

Beginning the reference signal's return path, the reference mirror output is summed in block 100 with the mirror to gimbal platform angle $\Theta_{m/g}$, divided in block 102 to account for the magnification of the telescope 26 and summed in block 104 with the telescope to gimbal platform angle $\Theta_{t/g}$ which has been operated upon in block 106 to account for the telescope magnification. In block 108, the gimbal to inertial space angle $\Theta_{g/I}$ is summed with the signal from block 104 to yield the beam aligner input, i.e., the angle of the returned test signal.

In block 110 the IMU to inertial space angle $\Theta_{IMU/I}$ is summed with that of the returned test signal and in block 112 that of the aligner to the IMU $\Theta_{c/IMU}$ is added to the resultant. This yields the measured aligner angle $\Theta_{col/meas}$. This is summed in block 114 with the measured IMU angle $\Theta_{IMU/meas}$ and an error signal, $\epsilon_{col}$ which represents the beam aligner measurement error. The output of this block is the measure line of sight $\Theta_{LOS/Meas}$.

The measured beam alignth 38 LOS motion, relative to the IMU 40 ($\Theta_{col/meas}$), is given by:

$$\Theta_{col/meas} = 2\{(2/M)\Theta_{m/g} + \Theta_{g/I}\} + 2\Theta_{IMU/I} \qquad (6)$$

Combining equations 4 and 6 yields the measured line of sight output $\Theta_{LOS/meas}$:

$$\Theta_{LOS/meas} = -2\epsilon_s \Theta_{g/I} - \epsilon_{IMU} - \epsilon_{col} \qquad (7)$$

where, by definition, $\Theta_{IMU/meas} = \Theta_{IMU/I} + \epsilon_{IMU}$, and $\epsilon_{IMU}$ is the IMU measurement error, which represents the accuracy limit of the IMU 40, and $\Theta_{col/meas} = \Theta_{LOS/meas} + \epsilon_{col}$, where $\epsilon_{col}$ is the beam aligner 38 measurement error.

In the autocalibration process the scanning mirror position scale factor a is adjusted until the measured LOS output is driven to zero:

$$\Theta_{LOS/meas} = 0 \qquad (8)$$

The inertial line of sight position, after calibration, (from equations 5, 7 and 8) is given by:

$$\Theta_{LOS/I} = -\epsilon_s \Theta_{g/I} = \epsilon_{IMU} + \epsilon_{col}/2 \qquad (9)$$

That is, assuming that the scanning mirror 38 position may be adjusted with sufficient accuracy, the LOS positioning calibration accuracy is limited by the beam aligner 38 measurement error and the IMU 40 accuracy. The measurement errors are assumed to be uncorrelated.

Note that the position magnitude adjustment gain term, being a function of the scanning mirror closed loop gain, the gyro closed loop gain and the measurement error's gain, is a complex term. Because the IMU 40 and beam aligner 38 are assumed to have much greater bandwidths than the stabilization system, phase errors are negligible at the disturbance frequencies used for calibration. The LOS motion due to a 5 Hz input disturbance was reduced by a factor of 31 using the calibration system. In terms of an actual disturbance to the imaging system, a 13 milliradians peak-to-peak 5 Hz disturbance of the gimbal base 24 (due to turbulence, for example) would create an inertial position error $\Theta_e$ of only 165 microradians.

In an alternative embodiment, the reference mirror 36 is mounted on the IMU 40 and the beam aligner 38 is located on the gimbal platform 22. Basically, the two devices simply exchange positions. This embodiment's advantage is that the beam aligner measurement error, $\epsilon_{col}$, is reduced in comparison to that of the first embodiment by the telescope's magnification M.

Figure 10:
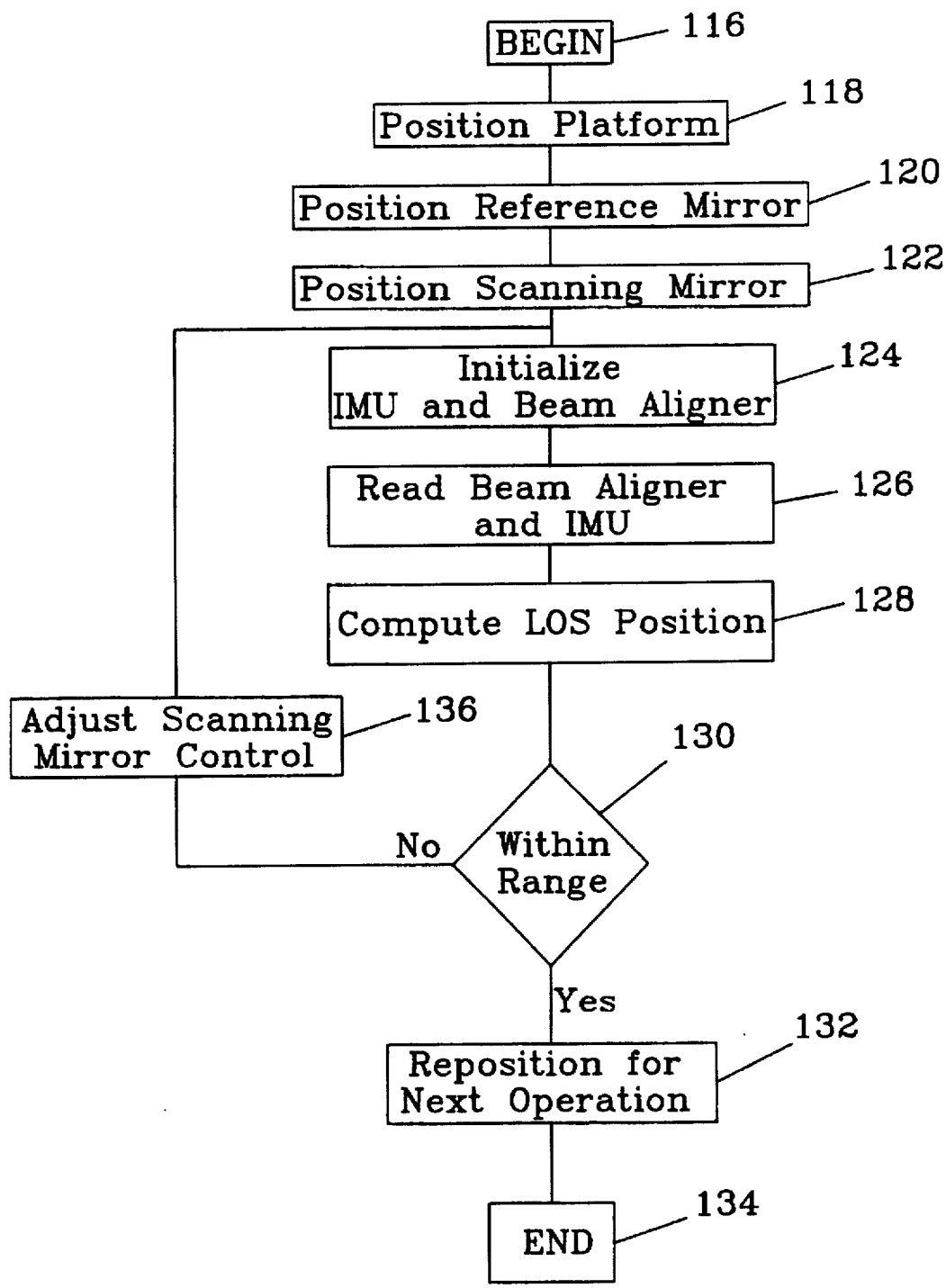
FIG. 10 is a flow chart of the autocalibration system's position calibration process.

A flow chart of the position calibration operation is given in FIG. 10. The process begins in block 116. In block 118 the controller 44 moves the platform 22 into a calibration position, i.e., one that will allow the scanning mirror 34 to be positioned within the field of view of the beam aligner. The operation proceeds to step 120, where the controller 44 moves the reference mirror 36 into a calibration position: one in which it intercepts light which passes through the telescope 26 and is reflected from the scanning mirror 34.

In step 122 the controller 44 moves the scanning mirror 34 to the calibration position. Then, in step 124 the controller 44 initializes the beam aligner 38 and IMU 40 and injects a disturbance $\alpha_d$ into the system. In step 126, the controller 44 reads the beam aligner 38 and IMU 40 measurements. Using these values the controller 44 computes, in step 128, the scanning mirror 34 LOS position.

In the decision block 130 the controller 44 determines whether the inertial position just computed is within the range required to yield sufficient pointing accuracy. If the LOS position is sufficiently accurate, the controller 44 proceeds to step 132 where it repositions the scanning mirror 34, the reference mirror 36 (moving it out of the line of sight) and the platform 22 and, from there, proceeds to the end of the calibration process, step 134.

If, on the other hand, the controller 44 determines in the decision block 130 that the inertial position is outside the acceptable range, the controller 44 proceeds to step 136, where it adjusts the scanning mirror 34 control parameter a in order to reduce the positioning error. From there, the controller 44 proceeds to step 124 and continues as before.

Figure 11:
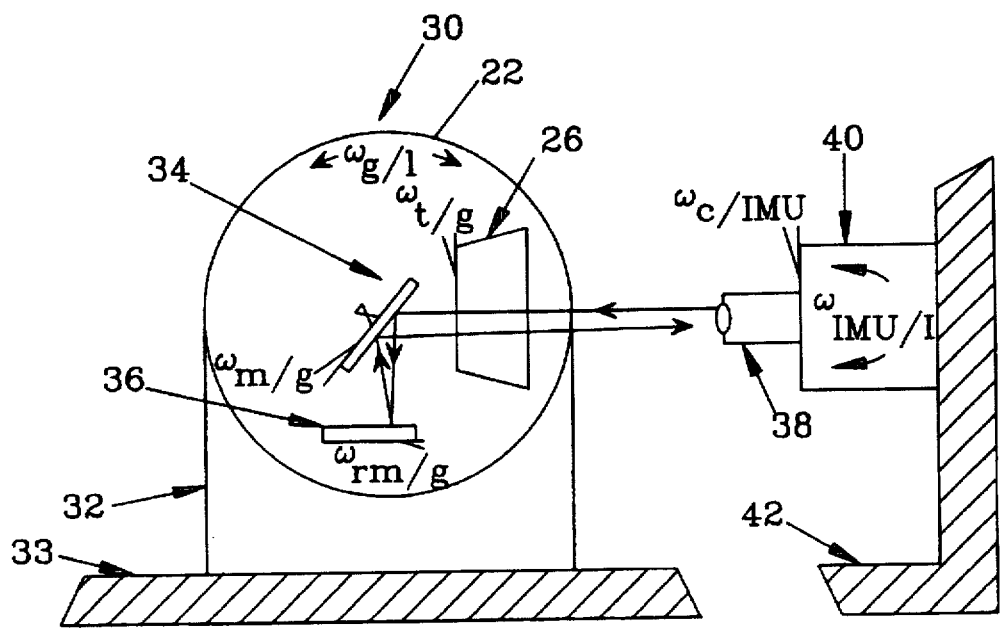
FIG. 11 is a simplified elevation view of the physical layout and angular rate relationships among components which are used in calibrating the back-scanning mirror's angular rate.

The back-scanning step and stare imaging system scan rate (i.e., the rate at which the system integrates images, not the static positioning just discussed) may be calibrated using similar techniques. FIG. 11 illustrates the back-scanning imager, with the system's physical scanning parameters labeled. As illustrated, $\omega_{g/I}$ is the angular rate of the gimbal platform 22 relative to inertial space, $\omega_{t/g}$ is the angular rate of the telescope 26 relative to the gimbal platform 22, $\omega_{m/g}$ is the scanning mirror 34 angular rate relative to the gimbal platform 22, $\omega_{rm/g}$ is the angular rate of the reference mirror 36 relative to the gimbal platform 22, $\omega_{c/IMU}$ is the beam aligner's angular rate relative to the IMU, and $\omega_{IMU/I}$ is the IMU's angular rate relative to the inertial reference frame. The interaction of these parameters to yield the system scan rate will be discussed in detail in connection with the rate calibration block diagram of FIG. 13.

Figure 12:
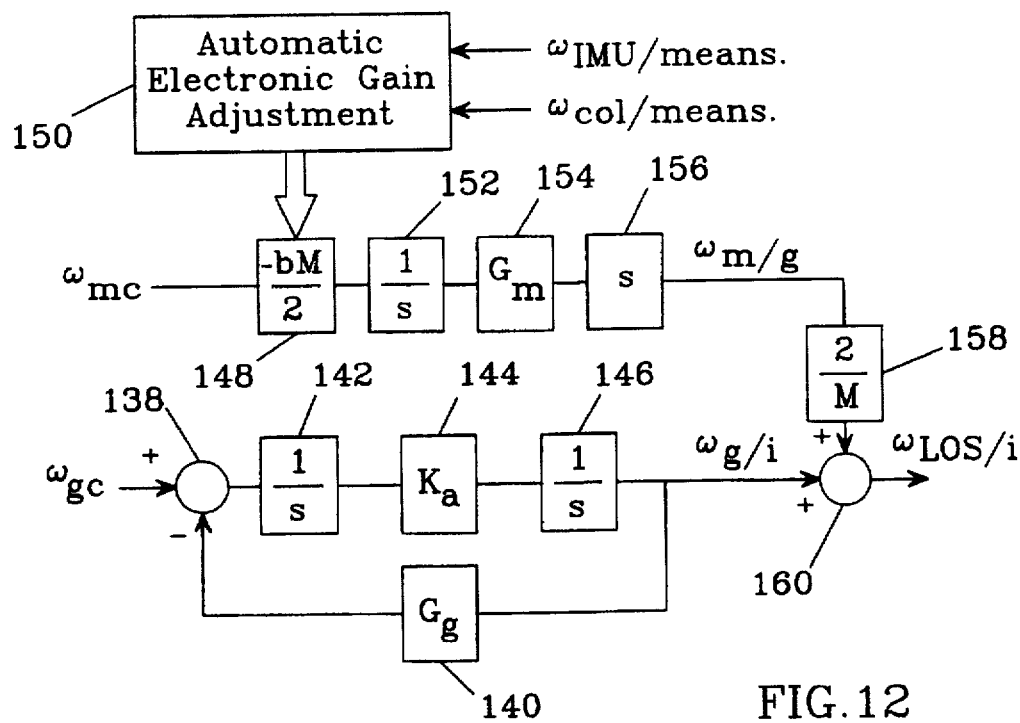
FIG. 12 is a block diagram of the back-scanning imager's angular rate control system.

The block diagram of FIG. 12 illustrates the back-scanning system's angular rate control system. The block labeled "automatic electronic gain adjustment" indicates that the controller 44 uses feedback from the IMU 40 and beam aligner 38 regarding the output inertial line of sight scan rate, $\omega_{LOS/I}$, to adjust the mirror scan rate scale factor b, which operates on the mirror scan rate $\omega_{m/c}$, the original, targeted mirror scan rate, until $\omega_{LOS/meas}$ is minimized. $K_a$ is the gimbal inertial rate loop gain, $G_m$ is the scanning mirror 34 closed loop gain/phase transfer function, $G_g$ is the closed loop gyro rate gain/phase transfer function, M is the telescope's magnification and b is the mirror scan rate scale factor adjustment term.

As described above, the scanning mirror 34 rotates in relation to the gimbal platform 22 while the gimbal platform 22 rotates in relation to inertial, target, space. The combination of these movements yields an inertial line of sight scan rate $\Theta_{LOS/I}$ for the imager 28. The target scanning mirror rate $\omega_{mc}$ and gimbal rate $\omega_{gc}$ are illustrated as inputs to the system at the left of FIG. 12. The system output, i.e. the line of sight scanning rate $\Theta_{LOS/I}$ for the imager 28 is shown at the right of FIG. 12.

The gimbal platform rate input $\omega_{gc}$ is conventionally summed at summing junction 138 with the closed loop gyroscope gain factor $G_g$ from block 140. The output of summing junction 138 is integrated in block 142 to yield a position, then multiplied by the gimbal inertial rate loop gain $K_a$ in block 144 and integrated in block 146 to yield the angular rate of the gimbal platform relative to inertial space $\omega_{g/I}$.

The scanning rate input $\omega_{mc}$ is multiplied in block 148 by the scan rate adjustment factor $-bM/2$. In block 150 the controller 44 combines the measured IMU rate $\omega_{IMU/meas}$ and measured beam aligner rate $\omega_{c/I/meas}$ to adjust the scan rate adjustment factor. The result is integrated in block 152 then multiplied by the scanning mirror closed loop gain $G_m$ in block 154 and differentiated in block 156 to produce the scanning mirror to gimbal platform scan rate $\omega_{m/g}$. This rate is multiplied by $2/M$ in block 158 to account for the magnification of the telescope 26. The gimbal platform to inertial space scan rate $\omega_{g/I}$ and the scanning mirror to gimbal platform scan rate $\omega_{m/g}$ (adjusted by $2/M$) are summed in summing block 160 to produce the inertial line of sight LOS/I scan rate. As previously discussed, this is the rate at which the line of sight of the imager 28 rotates through the target area's inertial reference frame. The auto-calibration system adjusts, through the feedback activity of block 150, the scan rate adjustment factor until $\omega_{LOS/I}=0$. The scanning system line of sight rate relative to inertial space, $\omega_{LOS/I}$, is given by:

$$\omega_{LOS/I}=(2/M)\omega_{m/g}+\omega_{g/I} \qquad (10)$$

where:

$\omega_{LOS/I}$=the scanning system inertial line of sight rate
$\omega_{m/g}$=the scanning mirror rate magnitude
$\omega_{g/I}$=the gimbal inertial rate and $$\omega_{LOS/meas}=\omega_{c/I/meas}-\omega_{IMU/meas}.$$

where:

$\omega_{c/I/meas}$=the beam aligner rate, relative to the IMU
$\omega_{IMU/meas}$=the measured IMU rate.

Furthermore, the mirror rate relative to the gimbal is given by:

$$\omega_{m/g}=(-bM/2)G_m\omega_{mc} \qquad (11)$$

where:

$\omega_{m/g}$=scanning mirror rate, relative to the gimbal
$bM/2$=mirror rate adjustment scale factor
$G_m$=closed loop mirror gain/phase transfer function
$\omega_{mc}$=mirror scan magnitude input The gimbal inertial rate, in terms of the gimbal rate input, is given by:

$$\omega_{g/I}=G_s\omega_{gc} \qquad (12)$$

where:

$$G_s=K_a/(s^2+K_aG_g)$$

Defining $bG_m\omega_{mc}/G_s\omega_{gc}=1+\rho_m$, where $\rho_m$ is the mirror rate adjustment error, the mirror rate, from equations 11 and 3 is given by:

$$\omega_{m/g}=-(M/2)(1+\rho_m)\omega_{g/I} \qquad (13)$$

The inertial line of sight rate, from equations 10 and 13 is:

$$\omega_{LOS/I}=-\rho_m\omega_{g/I}=-\rho_mG_s\omega_{gc} \qquad (14)$$

Figure 13:
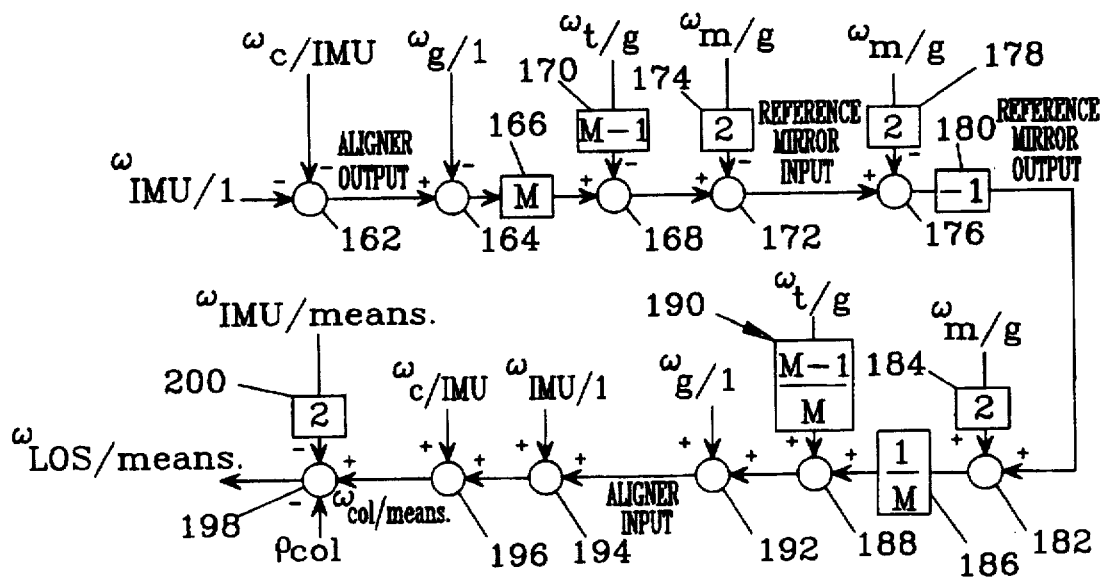
FIG. 13 is the angular rate calibration block diagram.

The rate calibration block diagram is illustrated in FIG. 13. The rate of the beam aligner relative to the IMU $\omega_{c/IMU}$ and the rate of the IMU relative to inertial space $\omega_{IMU/I}$ are combined in block 162 to yield the angular rate of the beam aligner output test signal. This rate is combined in block 164 with the gimbal platform to inertial space angular rate $\omega_{g/I}$ then multiplied in block 166 by the telescope magnification M. The resultant is summed in block 168 with the rate of the telescope relative to the gimbal platform $\omega_{t/g}$, after $\omega_{t/g}$ has been multiplied in block 170 by M-1, to account for the telescope magnification. The resultant is then summed in block 172 with the scanning mirror to gimbal platform rate $\omega_{m/g}$ which has been multiplied in block 174 by 2 to account for the effect of the beam passing through the telescope 26. At this point, the input to summing block 176 represents the angular scan rate of the calibration beam as it reaches the reference mirror 36.

The other input to the summing block 176 is the reference mirror to gimbal platform rate $\omega_{rm/g}$ which is multiplied by 2 in block 178, again, to account for the effect by the telescope 26 on the calibration signal. The sign reversal of block 180 indicates that the angular rate now refers to the reflected signal from the reference mirror 36.

This rate is summed in block 182 with the scanning mirror to gimbal platform angular rate $\omega_{m/g}$, which has been multiplied in block 184 by 2 to account for the signal's return trip through the telescope 26. Similarly, multiplication by 1/M in block 186 takes into account the effect of the magnification of the telescope 26 on the signal's reverse trip. The summing block 188 and multiplication block 190 add the contribution of telescope to gimbal platform angular rate $\omega_{t/g}$ and the resultant is summed in summing block 192 with the gimbal platform to inertial space angular rate $\omega_{g/I}$ to yield the angular rate of the test signal as it returns to the beam aligner 38.

The summing of block 194 adds the effect of the IMU to inertial space scanning rate $\omega_{IMU/I}$ and block 196 adds that of the beam aligner to IMU $\omega_{c/IMU}$; the resultant angular rate is the measured beam aligner angular rate $\omega_{col/meas}$. This rate is summed in block 198 with the measured IMU rate $\omega_{IMU/meas}$ from block 200 and the beam aligner measurement error $\rho_{col}$ to yield the measured line of sight scan rate $\omega_{LOS/meas}$. The reference mirror 36 rate relative to the gimbal, $\omega_{rm/g}$, and the rate of the beam aligner mounting relative to the IMU, $\omega_{c/IMU}$, are assumed to be zero.

The measured beam aligner LOS rate relative to the IMU is given by:

$$\omega_{col/meas} = 2\{(2/M)\omega_{m/g} + \omega_{g/I}\} + 2\omega_{IMU/I} \quad (15)$$

Defining $\omega_{IMU/meas} = \omega_{IMU/I} + \rho_{IMU}$, where $\rho_{IMU}$ is the IMU rate measurement error, and $\omega_{col/meas} = \omega_{LOS/meas} + \rho_{col}$, where $\rho_{col}$ is the beam aligner rate measurement error, the measured LOS rate output ($\omega_{LOS/meas}$) from equations 13 and 15 is:

$$\omega_{LOS/meas} = -2\rho_m \omega_{g/I} - 2\rho_{IMU} - \rho_{col} \quad (16)$$

In the autocalibration process, the mirror rate magnitude is adjusted until the measured beam aligner rate output is minimized:

$$\omega_{LOS/meas} = 0 \quad (17)$$

The inertial line of sight rate, after calibration, is given by:

$$\omega_{LOS/I} = -\rho_m \omega_{g/I} - \rho_{IMU} + \rho_{col}/2 \quad (18)$$

That is, the inertial LOS rate accuracy is limited by the beam aligner 38 rate measurement error and the IMU 40 rate accuracy (assuming that the mirror rate magnitude adjustment has a gain adjustment resolution finer than the beam aligner rate and IMU rate accuracy).

For example, given a staring imager that encompasses 0.5° within its field of view and scans at the rate of 30 frames/second, the equivalent line of sight rate is 260 milliradians/second. At 30 frames/second, there are 33 milliseconds/frame. During each frame period the imager must be positioned, the target image must be integrated, and the image must be read out of the imager. The integration period may therefore be approximately 10 milliseconds.

If the imaging system's inertial line of sight rate specification requires 0.1% accuracy (i.e., the backscanning mirror 34 must cancel the motion of the gimbal platform 22 to within 0.1%), the maximum permissible linear LOS motion during the integration period would then be 2.6 microradians at the detector. From equation 18, the typical LOS rate cancellation calibration error is:

$$\omega_{LOS/I}(1\sigma) = [(\sigma_{IMU})^2 + (\sigma_{col}/2)^2]^{1/2}$$

The Litton LN 100 G IMU specifies $\sigma_{IMU} = 10$ microradians/sec and the Micro-Radian Instruments' model 210 specifies $\sigma_{col} = 120$ microradians/sec.; therefore $\omega_{LOS/I} = 60.8$ microradians/sec., that is, accuracy to within 0.023%.

As discussed in connection with to the position calibration system, the beam aligner 38 and reference mirror 36 could be interchanged. For that embodiment the typical LOS rate cancellation calibration error is:

$$\omega_{LOS/I}(1\sigma) = [(\sigma_{IMU})^2 + (\sigma_{col}/2M)^2]^{1/2}$$

Assuming the same IMU 40 and beam aligner 38 are employed and that the telescope magnification M=10, $\omega_{LOS/I} = 11.7$ microradians/sec.

Figure 14:
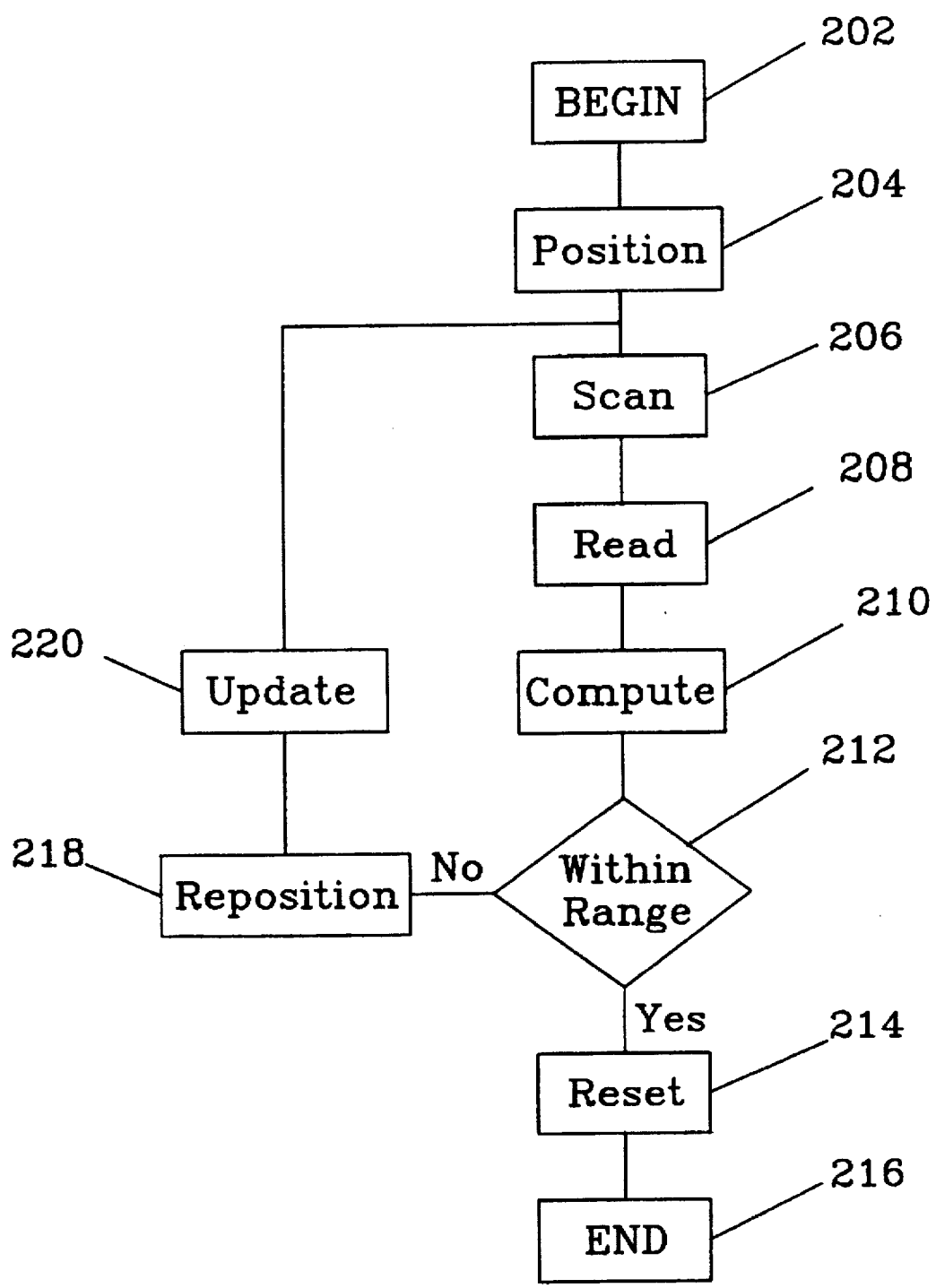
FIG. 14 is a flow chart of the autocalibration system's angular rate calibration process.

FIG. 14 is a flow chart of the angular rate calibration process. In block 202, the controller 44 begins calibration of the imager's angular rate. Next, in block 204, the controller 44 positions the platform 22, the reference mirror 36 and the scanning mirror 34 to begin the calibration process. In this step the reference mirror 36 is moved into position to reflect light from the scanning mirror 34 back off the scanning mirror, the platform 22 is positioned as though it were about to image the area that includes the beam aligner, and the scanning mirror 34 is positioned to begin a counter-rotating sweep of the targeted beam aligner.

In block 206 the controller 44 initiates a sweeping scan of the platform 22, at the prescribed angular rate $\omega_{gc}$, and the counter-rotation of the scanning mirror 34 at its prescribed rate $\omega_{mc}$.

While the platform 22 and mirror rotate and counterrotate, respectively (with the objective of effecting a "stare" operation), the controller, in block 208, initiates operation of the beam aligner and IMU. As described above in connection with the angular positioning calibration, the beam aligner 38 emits an optical signal which travels through the telescope, is reflected from the scanning mirror 34 into the reference mirror 36 and retraces this path to the beam aligner 38. The beam aligner 38 provides an output signal which indicates the location of the returned signal relative to the emitted signal.

Ideally, the scanning mirror's counter-rotation "cancels" the rotation of the platform 22, the signal from the beam aligner exactly retraces its path, and the beam aligner output is a steady "zero level". The controller 44 reads the outputs from the beam aligner and the IMU to determine whether the combination of platform 22 rotation and scanning mirror 34 counter-rotation has achieved the desired "staring" effect. In block 210, the controller 44 uses the values obtained from the IMU 40 and beam aligner 38 in step 208 to compute the system's inertial line of sight rate $\omega_{LOS/I}$, in which:

$$\omega_{LOS/I} = \omega_{col/meas} - \omega_{IMU/meas}$$

In the decision block 212 the controller 44 determines whether the inertial line of sight rate thus computed is within a satisfactory range near zero. As with the angular positioning determination, the permissible range may be selected prior to calibration and will be related to the angular resolution of the imaging system. If the inertial line of sight rate is acceptable, the controller 44 proceeds to step 214, where it resets the scanning system for image acquisition, i.e., it repositions the reference mirror 36 out of the imager's line of sight and rotates the platform 22 and scanning mirrors to imaging positions. The controller 44 then proceeds to step 216, where it ends the calibration process.

If, on the other hand, the controller 44 determines in step 212 that the system's inertial line of sight rate is unacceptable, the controller 44 proceeds to step 218 where it repositions the platform 22 and scanning mirror 34 for another calibration pass. The controller 44 then proceeds to step 220, where it updates the scanning mirror's rate scale factor b, thus adjusting the scanning mirror's rate in a direction which reduces the magnitude of the system line of sight rate. Next, the controller 44 returns to step 206, where it begins another calibration scan.

Although the invention has been described in considerable detail with reference to a preferred embodiment, other embodiments are possible. For example, the position of the reference mirror 36 and beam aligner could be exchanged. That is, the reference mirror 36 could be mounted upon the IMU and the beam aligner placed upon the gimbal platform 22. Furthermore, although the description referred specifically to imagers, any sensor used to map large areas may use the system and methods discussed herein. Therefore, the invention should be limited only in terms of the appended claims.

I claim:

1. An airborne gimbal mounted step and stare imaging system, the gimbal supported from an aircraft by a gimbal support, comprising:

a rotatable gimbal platform attached to the gimbal support to provide an axis of isolation from angular disturbances, imaging optics comprising a telescope, scanning mirror and imager which are affixed to the gimbal's platform and rotate along with the platform, a positioning system which positions the imaging optics in relation to an inertial reference frame, an imager positioned to receive images from the imaging optics, and an autocalibration system, comprising reference mirror, IMU, and beam aligner, distributed between the gimbal platform and the gimbal support for calibration of the imaging system's inertial position.

2. The imaging system of claim 1, wherein the imaging optics comprise a telescope positioned upon the platform such that its field of view rotates along with the platform in a direction which is substantially orthogonal to the platform's axis of rotation.

3. The imaging system of claim 2, wherein the imaging optics comprise a scanning mirror that is positioned in an optical path between the telescope and the imager and is subject to control by the positioning system.

4. The imaging system of claim 3, wherein the imager comprises an image capture system positioned to receive signals from the imaging optics and an image readout system connected to obtain images from the image capture system.

5. The imaging system of claim 4, wherein said platform rotates at a constant rate to provide step and stare imaging.

6. The imaging system of claim 5, wherein the scanning mirror counter-rotates at a rate which effectively cancels the rotation of the platform, thereby reflecting a stationary image from the telescope into the imager.

7. The imaging system of claim 6, wherein the autocalibration system comprises:

a reference mirror which is positioned by the controller outside the optical path between the scanning mirror and the imager during image acquisition operations and positioned by the controller in the optical path between the scanning mirror and imager during calibration, an inertial measurement unit mounted upon the gimbal support, and a beam aligner affixed to the inertial measurement unit and positioned by the controller such that its field of view is coincident with that of the telescope during calibration.

8. The imaging system of claim 6, wherein the autocalibration system comprises:

a beam aligner, a reference mirror positioned by the controller to reflect a signal from the beam aligner back into the beam aligner in response to commencement of the calibration process and out of the imager's optical path in response to the termination other times, and an inertial measurement unit which provides inertial measurements relative to the gimbal support to the controller.

9. An autocalibration system for a gimbal-mounted, step and stare back-scanning imaging system, comprising:

a controller, a beam aligner, calibration optics which, subject to control by the controller, alter the optical path of a test signal emitted by the beam aligner and an inertial positioning system which provides position information to and is controlled by the controller.

10. The autocalibration system of claim 9, wherein the calibration optics comprise a reference mirror which is positioned by the controller.

11. The autocalibration system of claim 10, wherein the inertial positioning system measures the position of an imaging system's imager line of sight relative to an inertial reference frame.

12. The autocalibration system of claim 11, further comprising an inertial measurement unit mounted upon the gimbal support, and a beam aligner mounted upon the inertial measurement unit in a position which permits the beam aligner to transmit signals to the imaging system's imager.

13. The autocalibration system of claim 12, wherein the controller places the reference mirror in an optical path between the imager and the beam aligner in response to commencement of a calibration sequence and removes it from the imager's field of view at the cessation of a calibration sequence.

14. The autocalibration system of claim 13, wherein the inertial positioning system comprises a beam aligner mounted upon the imager platform, an inertial measurement unit mounted upon the gimbal support, and a reference mirror mounted upon the inertial measurement unit.

15. The autocalibration system of claim 14, wherein the controller places the reference mirror in the optical path between the imager and the beam aligner during calibration and removes it from the imager's field of view during image acquisition.

16. The autocalibration system of claim 15, wherein the controller comprises:

a processor, memory which the processor uses for storing data and instructions, and an input/output system through which the processor communicates.

17. The autocalibration system of claim 16, wherein the controller adjusts the position of the back-scanning mirror based upon measurements of the position of the back-scanning mirror relative to the gimbal support and to the inertial reference frame.

18. The autocalibration system of claim 17 wherein, the controller fixes the position of the platform relative to the gimbal support, and the inertial positioning system measures the inertial position of the imager's line of sight.

19. The autocalibration system of claim 18 wherein, the controller rotates the platform relative to the gimbal support, and the inertial positioning system measures the inertial position of the imager's line of sight.

20. A back-scanning step and stare imager comprising:

a rotatable planar gimbal platform suspended from a gimbal support which provides at least one axis of isolation from mechanical or other disturbances, a scanning mirror positioned upon the platform with a scanning axis orthogonal to the plane of the platform, a telescope positioned upon the platform to receive electromagnetic radiation from a target scene, an image processor positioned to receive radiation transmitted through the telescope and connected to effect movement of the platform, a scanning mirror positioned in the optical path between the telescope and the image processor, a reference mirror positioned along an optical path between the scanning mirror and the image processor, a beam aligner positioned along the periphery of the platform so that an electromagnetic signal transmitted from the beam aligner travels along an optical path through the telescope to the scanning mirror, is reflected from the reference mirror to the scanning mirror and back to the beam aligner, an inertial measurement unit, and a controller connected to receive measurements from the beam aligner, the inertial measurement unit, the reference mirror and the scanning mirror and to transmit position control signals to the reference mirror and to the scanning mirror.

21. A method of automatically calibrating the imager line of sight position of a back-scanning step and stare imaging system using the system's reference optics, beam aligner, inertial measurement unit, imager and controller, comprising:

A. moving reference optics and imager into a calibration position

B. initializing the system's beam aligner and inertial measurement unit and injecting a known disturbance into the imaging system, C. transmitting a test signal from the beam aligner through the imaging system to the reference optics and back to the beam aligner, D. reading the outputs of the beam aligner and the inertial measurement unit, E. computing the imager line of sight position based upon the measurements obtained in steps D, F. moving the reference optics and the imager out of the calibration position and quitting the calibration process if the position computed in step E is within an acceptable range, G. adjusting the position of an imaging system component if the position computed in step E is outside an acceptable range, and H. returning to step B.

22. A method of automatically calibrating the imager line of sight angular rate of a back-scanning step and stare imaging system using the system's reference optics, scanning mirror, beam aligner, inertial measurement unit, gimbal-platformmounted imager and controller, comprising:

A. moving reference optics and imager into a calibration position,

B. rotating the gimbal platform at a predetermined rate,

C. counter-rotating the scanning mirror at a rate chosen to counteract the platform's rotation, thereby creating a stationary imager line of sight, D. transmitting a series of signals from the beam aligner through the imaging system to the reference optics and back from the reference optics to the beam aligner during a calibration period, E. reading the output of the beam aligner during the calibration period, F. reading the output of the inertial measurement unit during the calibration period, G. computing the inertial line of sight rate of the imager based upon the measurements obtained in steps E and F, H. moving the reference optics out of the calibration position and quitting the calibration process if the rate computed in step G is within an acceptable range, I. adjusting the rate of the scanning mirror if the rate computed in step G is outside an acceptable range, and J. returning to step A.

* * * * *